Feb. 4, 1969     A. L. WING     3,425,681
FIXTURE DEVICE
Filed Oct. 21, 1965
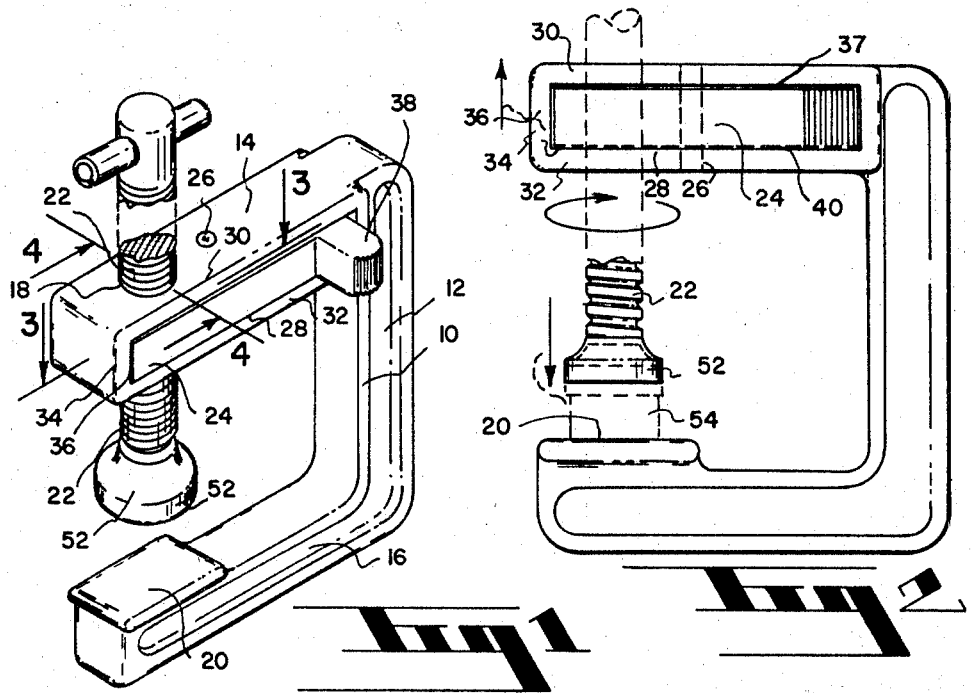
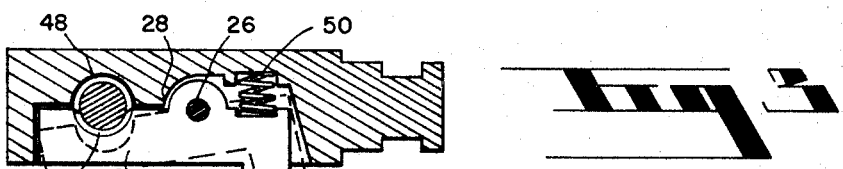
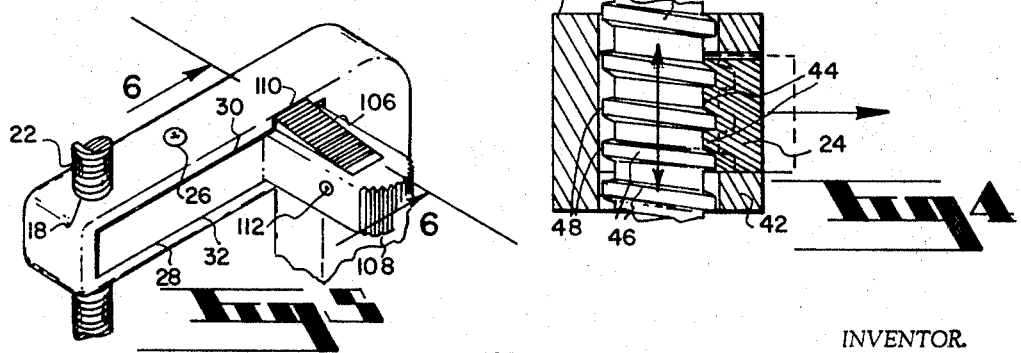
INVENTOR.
ALBERT L. WING
BY
Wm. H. Dean

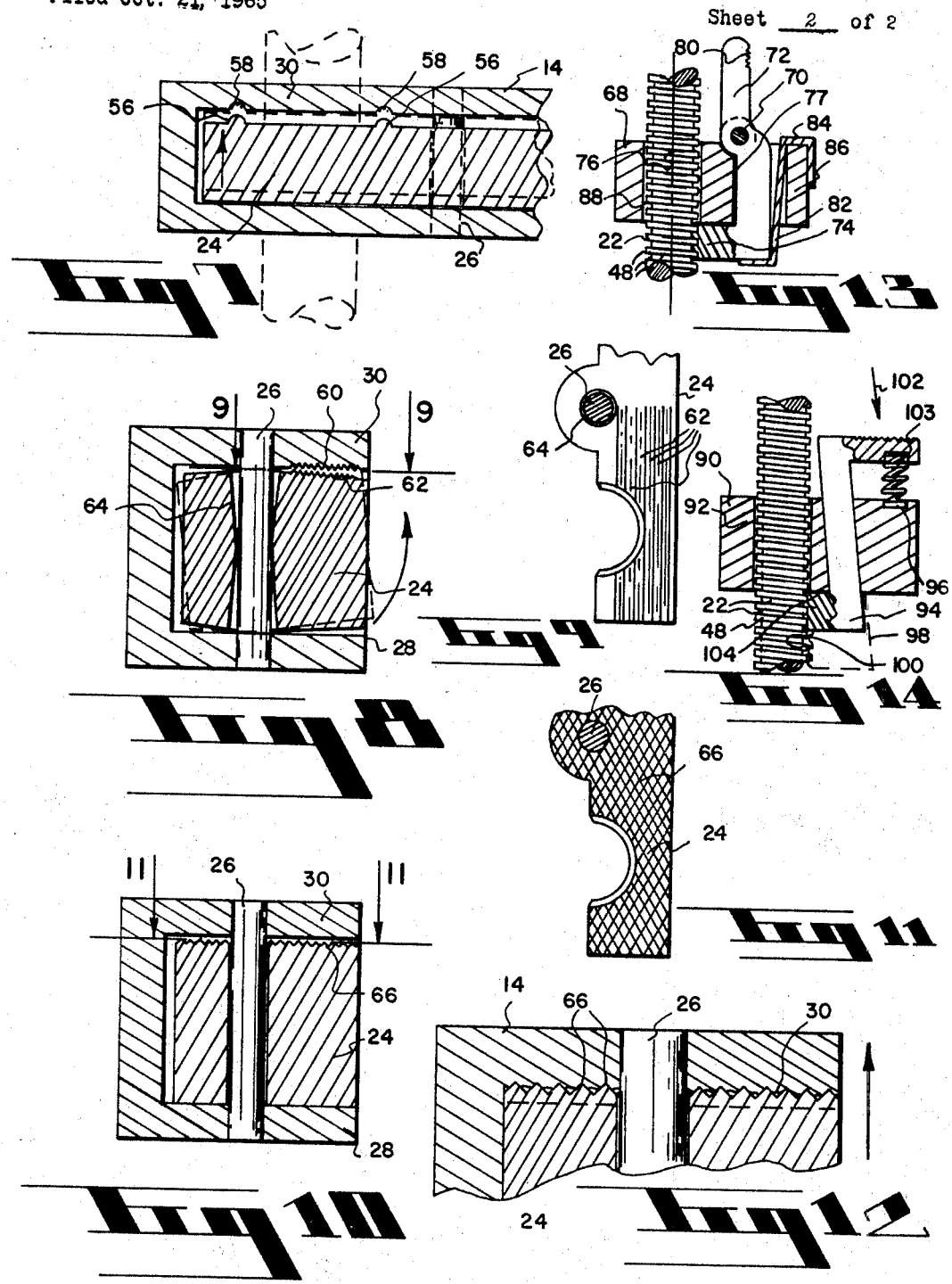

United States Patent Office 3,425,681
Patented Feb. 4, 1969

3,425,681
FIXTURE DEVICE
Albert L. Wing, 1220 McKemy St., Tempe, Ariz. 85281
Filed Oct. 21, 1965, Ser. No. 499,322
U.S. Cl. 269—182     2 Claims
Int. Cl. B25b 1/12, 5/10

ABSTRACT OF THE DISCLOSURE

A fixture device specifically including a C-shaped clamp frame member having a pair of substantially parallel arms between which articles may be clamped together; a smooth bore extending through one of said arms with a helically threaded clamp screw slidably movable through said bore; one of said arms having a channel-shaped recess therein, wherein a latch member is pivotally mounted, the latch member being mounted between two walls of the recess and closely fitted therein and having a threaded segment engagable with screw threads of the clamp screw, such that when pressure is applied axially of the clamp screw, the arm having the recess is deflected thereby binding the segment nut member between said walls as they are deflected and holding the segment nut member in meshed relation with the clamp screw.

---

This invention relates to a fixture device and more particularly to a fixture device applicable to C-clamps or other similar holding fixtures wherein a helical screw must be adjusted into clamping position before it is capable of being tightened and whereby a simple releasable segment nut means of the invention permits slidable movement of a clamping screw into approximate clamping position whereupon the segment nut maybe engaged with the screw and final tightening of the clamping screw may be accomplished, all of which save time and labor.

Conventional C-clamps which are employed for many holding and clamping operations are time consuming in their operation due to the fact that long clamping screws must be helically rotated a great number of times in order to get a substantial axial adjustment of the clamping screw to a position at which it may tightened against work or against articles to be clamped together. Oftentimes, conventional C-clamps must be adjusted by laboriously rotating the clamping screw in one direction to clear an object to be clamped and then must be laboriously rotated in the opposite direction to engage work to be clamped, all of which consumes considerable time and effort and which is sometimes very inconvenient when articles are to be held in place at the same time pending the clamping of such articles together by the conventional C-clamp.

C-clamps are used in many industries and shops and for a great variety of purposes and the aforementioned time consuming operation of such C-clamps causes the loss of a great aggregate of manpower.

Accordingly, it is an object of the present invention to provide a clamping fixture which may be used as an integral part of a C-clamp or other clamping device and which may save considerable time and labor in the adjustment of clamping fixtures preliminary to the tightening thereof for holding various articles together or for clamping operations.

Another object of the invention is to provide a clamping fixture wherein a fixture arm is provided with a smooth bore opening therethrough in which a clamping screw is axially slidably mounted and which is removably engaged by a segmental nut so that when the nut is disengaged from the screw, it may be slidably moved in to an approximate close clamping position whereupon engagement of the nut with the screw permits final tightening of the screw into a desired clamping position.

Another object of the invention is to provide a novel combination of a clamping screw, an arm in which the clamping screw is axially slidably mounted and a segmental nut removably engageable with threads of the clamping screw and having means causing the segmental nut to be held securely in thread meshed relationship with the screw during tightening operations thereof.

Another object of the invention is to provide a novel clamping fixture having an arm provided with a bore in which a clamping screw is axially slidably mounted and wherein a segmental nut is movably to engage and disengage the clamping screw and wherein means is provided in response to axial thrust of the screw on the nut for locking the nut into firm engaged position with the screw to prevent disengagement of the screw threaded portions of the nut with the screw during tightening of the screw against work being clamped.

Another object of the invention is to provide a variety of simple mechanism for partially operating a clamp screw and forcefully moving the clamping screw axially into engagement with work means of a simple engageable and disengageable segmental nut.

Another object of the invention is to provide a novel clamping fixture having a clamping screw axially slidably mounted in a bore of an arm member and whereon a movably mounted segmental nut is engageable and disengageable with the clamping screw and whereby means is provided for retaining threads of the nut in mesh with threads of the clamping screw during tightening operation of the clamping screw with respect to work or articles being clamped together.

Further objects and advantages of the present invention may be apparent from the following specification, appended claims and accompanying drawings, in which:

FIG. 1 is a perspective view of a clamping fixture of the present invention and more particularly representing the invention in the form of a C-clamp and showing portions thereof broken away and in section to facilitate the illustration;

FIG. 2 is a side elevational view of the invention, as shown in FIG. 1, illustrating parts and portions fragmentarily and showing by broken lines articles being clamped together in the clamping fixture of the invention;

FIG. 3 is a sectional view taken generally from line 3—3 of FIG. 1;

FIG. 4 is an enlarged fragmentary sectional view taken from the line 4—4 of FIG. 1;

FIG. 5 is a perspective view of a further modified form of the invention showing parts and portions thereof fragmentarily;

FIG. 6 is a sectional view taken from the line 6—6 of FIG. 5;

FIG. 7 is an enlarged fragmentary sectional view showing a modification of the invention generally disclosed in FIGS. 1 and 3.

FIG. 8 is an enlarged sectional view taken axially through a pivotal axis of a pivoted segmental nut structure of the invention and showing a modification of the structure disclosed in FIGS. 1, 2 and 3;

FIG. 9 is a plan sectional view taken from the line 9—9 of FIG. 8 showing a fragmentary portion of the modified segmental nut of the invention and showing the clamping fixture on member omitted;

FIG. 10 is a view similar to FIG. 8 and showing a further modified form of the invention;

FIG. 11 is a plan sectional view taken from the line 11—11 of FIG. 10 and showing fragmentarily only a portion of the segmental nut structure of the invention, FIG. 11 being similar to FIG. 9;

FIG. 12 is an enlarged fragmentary sectional view showing in detail, the structure disclosed in FIGS. 10 and 11 of the drawings in an operative position;

FIG. 13 is a fragmentary sectional view of a further modified form of the invention; and FIG. 14 is another view similar to FIG. 13, but showing a still further modified form of the invention.

As shown in FIGS. 1 and 2 of the drawings, a clamping fixture of the invention may be in the form of a C-clamp comprising a generally C-shaped frame 10 having an intermediate body portion 12 provided with a pair of arms 14 and 16 spaced from each other and extending generally in a parallel relationship to each other.

The arm 14 is provided with a smooth bore 18 disposed on an axis which may intersect both of the arms 14 and 16. This bore 18 is directed toward an anvil portion 20 of the arm 16 and an externally screw threaded clamping screw 22 is axially slidably mounted in the bore 18 and removably engaged by a segmental nut member 24 which is pivotally mounted on the arm 14 by means of a pin 26. The segmental nut 24 is movably disposed in a recess 28 in one side of the arm 14, the recess 28 thus forming normally spaced parallel walls 30 and 32 at opposite sides of the segmental nut member 24 and an end wall 34 integrally interconnects the walls 30 and 32 beyond an end 36 of the segmental nut member.

This segmental nut member is provided with a manually engageable operating projection 38 tending manually to be engaged for the purpose of pivoting the segmental nut 24 about the axis of the pin 26, as will be hereinafter described in detail.

Opposite sides 38 and 40 of the segmental nut 24 are in close proximity to the side walls 30 and 32 of the recess 28 to provide for binding of the nut 24 into fixed position upon deflection of the walls 30 and 32, as will be hereinafter described.

As shown in FIGS. 3 and 4 of the drawings, the segmental nut 24 is provided with a threaded segment 42 which may be only semi-circular of slightly less than semi-circular in its engagement with the peripheral threads of the screw 22. This threaded segment portion 42 is provided with helical screw thread portions 44 which are provided with flat apices and which are of a low included angle or acute included angle in conformance with similar threads 46 on the screw 22. These threads 46 having flat surfaces 48 bear against the bore 18 in opposition to engagement thereof with the threaded segment 42 at the threaded portions 44 thereof.

The nut member 24 being pivoted on the pin 26 in the recess 28 is urged to engage the peripheral threads 48 of the screw 22 by means of a spring 50 disposed in the recess 28 and forcing the segmental nut member 24 outwardly at the handle 38 and inwardly at the threaded segmental nut portion 42 normally tending to maintain the screw threads 44 thereof in engagement with the peripheral screw threads 48 of the screw 22.

In operation, when a rotating head 52 secured to the screw 22 is engaged with work 54 carried on the anvil 20 and when the screw 22 is tightened with respect to the threaded segment 42, axial thrust of the screw 22 tends slightly to deflect the arm 14 and its walls 30 and 32 at which time they grip opposite respective edges 38 and 40 of the nut 24 and tend to bind it in the recess 28 against pivotal movement about the axis of the pin 26, thus, tending to prevent disengagement of the nut 24 relative to the screw 22 which may tend to result from the cam action of the engaged threaded portions 44 and 48. Deflection of the arm 14 and its walls 30 and 32, thus, hold the segmental nut 24 in bound fixed position with respect to the screw 22 and, thus, prevent disengagement of the threaded segment portion 44 relative to the peripheral helical threads 48 of the screw 22.

In operation, the handle 38 is pressed inwardly to release the segment thread portions 44 from the peripheral threads 48 thereby permitting the screw 22 to be axially slidably moved in the bore 18 so that the clamping head 52 may be quickly disposed in approximately clamping position so that release thumb handle 38 permits the spring 50 to engage the threads 44 with the threads 48 so that final tightening of the screw 22 involves a minimum of rotation thereof, thus, saving the operator of the clamp considerable time which would otherwise be used in rotatably adjusting the screw to attain approximate axial adjustment of the screw preliminary to the final clamping operations. It will be appreciated by those skilled in the art that the binding of the nut 24 in the recess 28 by deflection of the walls 30 and 32 thereof provides a novel means for holding the nut in engagement with the threads of the screw 22.

As a modification of this structure, the nut 24 as shown in FIG. 7, may have projecting nibs 56 which may be forced axially into conforming recesses 58 in the upper wall 30 of the arm 14. These nibs 56, when in the recesses 58 prevent the segmental nut 24 from being pivoted about the axis of the pin 26 and out of engagement with the peripheral threads 48 of the clamping screw 22.

A further modification of the invention, shown in FIGS. 8 and 9, includes serrations 60 on the inner surface of the wall 30 and mating serrations 62 on the adjacent edge of the nut 24, the nut 24 having a clearance hole 64 around the pin 60 to permit slight tilting of the nut in the recess 28, such that the serrations 60 engage the serrations 62 when axial thrust of the crew 22 forces the nut against the wall 30. Thus, nut 24 is prevented from pivoting about the axis of the pin 26 and, thus, the segmental threaded portions 44 are maintained in engagement with the peripheral threads 48 of the screw 22 when the clamp is tightened against work, or the like.

A further modification of the invention is shown in FIGS. 10, 11 and 12, wherein conventional knurling or crossed serrations 66 are provided on the nut 24 adjacent to the wall 30 to thereby lock the nut 24 against pivotal movement about the axis of the pin 26 when the clamping screw 22 is tightened, as hereinbefore described.

As shown in the enlarged view, FIG. 12, the cross serrations 66 may become slightly embedded in the wall 30 and thereby positively lock the nut 24 relative to the arm 14 as a result of thrust reaction from the screw 22 to the nut 24.

In the modification shown in FIG. 13, an arm 68 similar to the arm 14 carries a pivot pin 70 on which a segmental nut 72 is pivotally mounted. This segmental nut 72 is provided with segment thread portions 74 which may extend in a semi-circular relation around the clamping screw 22. The axis of the pin 70 is disposed laterally with relationship to the central axis 76 of the screw 22, such that an over center action occurs with relation to thrust reaction of the nut 72 in response to axial force applied by the screw 22 during tightening operations thereof, this causes a tendance of the threaded segment portions 74 to pivot toward the clamping screw 22 during tightening thereof and to cause the segmental nut 72 to abut the arm 68 at 76 to thereby provide a stop which is disposed in accordance with a full thread engagement of the thread portions 74 of a segmental nut 72 and the external screw threads 48 of the clamping screw 22.

A thumb handle 80 is used to pivot the segmental nut 72 at its threaded portions 74 out of engagement with the peripheral threads 48 in opposition to a spring 82 which tends to hold the threaded portions 74 in engagement with the threads 48. This spring 82 is mounted by means of a clip portion 84 thereof on a portion 86 of the arm 68.

In operation, the segmental nut 72 is pivoted out of engagement with the screw 22 in order to provide for axial slidable adjustment of the screw 22 in a bore 88 of the arm 68, said bore 38 being similar to the bore 18, hereinbefore described.

It will be understood that the modification, shown in FIG. 13, represents another means of the invention which is responsive to axial thrust of the screw and the nut to cause the nut to be held in threaded meshed engagement with the screws during tightening thereof.

Likewise, the modification shown in FIG. 14, discloses a means responsive to axial thrust of the screw and the nut for holding the nut in engagement with the screw. All of these structures of the invention are predicted upon disengageable nut segment portions being operable against clamping screws and extending only a partial peripheral distance around the screw in engagement therewith.

Specifically, the modification shown in FIG. 14, is provided with an arm 90 similar to the arm 68 disclosed in FIG. 13 this arm 90 is provided with a smooth bore 92 in which the clamping screw 22 is axially slidably mounted A segmental nut 94 is slidable in an opening 96 directed at an acute angle to the axis of the screw 22, such that the segmental threaded portion 98 of the segmental nut 94 may be moved into a broken line position 100 by sliding the segmental nut 94 in a direction of an arrow 102 in the opening 96 against compression of a spring 104 which tends to hold the segmental nut 94 in the solid line position, as shown in FIG. 14. This modification of the invention is operable to release the segmental nut from the screw 22 to permit axial slidable adjustment of the screw 22 through the bore 92 to an approximate clamping whereupon release of the segmental nut 94 permits the spring 104 to return it to a solid line position in which an abutment portion 104 of the segmental nut 94 abuts the adjacent surface of the arm 90 to insure stopping the segmental nut 98 at a position in which the segmental threads 98 thereof fully mesh with the peripheral threads 48 of the screw 22 and to prevent these threads from moving any further inward and creating a binding effect upon the threads 48 of the screw 22. It will be appreciated by those skilled in the art that when the screw 22 is tightened, it forces the segmental nut 94 to abut the arm 90 at 104 and precisely to engage the threads of the nut and the screw and to hold them in firm engagement and precise engagement during tightening of the screw 22 against work.

It will be understood that the invention may be applied to a C-clamp or may include only a single arm in which the screw 22 is operable and alternately engageable and disengageable by a segmental nut for the purpose of adjusting the screw axially through the arm to an approximate clamping position whereupon the segmental nut is provided with means for holding the nut firmly in engagement with the screw during tightening thereof.

While the structures, as hereinbefore described, are responsive to axial thrust of the screw and the nut for holding the nut engaged with the screw, the structure disclosed in the modification shown in FIGS. 5 and 6, do not rely upon axial thrust of the screw and the nut for holding the nut in engagement with the screw, but rather employ a pivoted latch member 106 mounted on a thumb engaging portion 108 of a segmental nut 110 which is similar to the nut 24 shown in FIGS. 1, 2 and 3 of the drawings. The latch member 106 is provided with an abutting end 110 which abuts an edge of the wall 30 of the arm 14. The latch member 106, as shown in FIG. 6 of the drawings, is pivoted on a pin 112 and is urged outward at its end 110 to engage the edge of the wall 30 and to prevent pivotal movement of the segmental nut 110 in a direction to disengage the threads 44 from the threads 48, as shown in FIG. 4 of the drawings. It will be understood that the structure shown in FIGS. 5 and 6 are similar to those shown in FIGS. 1, 2 and 3, except that the latch 106 is added to the segmental nut 110 which is otherwise similar to the segmental nut 28.

In operation of the modified structure shown in FIGS. 5 and 6, the latch 106 may be depressed and pivoted about the axis of the pin 112, such that the end 110 of the latch 106 is moved out of interference with the wall 30 permitting the segmental nut to pivot inwardly about the axis of the pin 26 and to permit the segmental threads 44 to move outwardly and be relieved from the peripheral threads 48 of the screw 22.

In accordance with the foregoing, it will be understood that the broad combination of applicant's invention includes the clamping screw 22 freely axially movable in an arm or member in a smooth bore therein and a segmental nut engageable therewith and means for preventing the disengagement of a segmental nut from the screw when the screw is tightened. The latch 106 being the modification of the previously described mechanisms which are automatically responsive to axial thrust of the screw and the nut for locking the nut in position and engagement relatively to the screw.

It will be obvious to those skilled in the art that various modifications of the present invention may be resorted to in a manner limited only by a just interpretation of the following claims.

I claim:

1. In a clamping fixture the combination of: a generally C-shaped frame having a pair of spaced arms; one of said arms having an opening therein; a clamp screw having externally screw threads and slidably mounted in said opening, the axis of said clamp screw disposed generally to intersect both of said arms; a segmental nut member movably mounted on said one of said arms and having a segmental female threaded portion movable into and out of mesh with said external screw threads of said clamping screw; said one of said arms having a recess therein surrounded by three walls, two of said walls being spaced relative to each other and substantially parallel with said other arm of said pair, said two of said walls disposed at substantially right angles to the axial thrust direction of said screw, the third one of said three walls interconnecting said two spaced walls at an end of said one of said arms, said segmental nut being pivoted between said two of said walls and closely fitted therebetween, such that axial thrust of said screw tending to deflect said two of said walls causes them to deflect into frictional engagement with said segmental nut member and to lock it into position, such that the threads of said segmental nut are held in meshed relation with the threads of said clamping screw.

2. The fixture, as defined in claim 1, wherein: said clamp screw is provided with screw threads having substantially flat surfaces on their peripheral portions engageable with the side of said opening in said frame and disposed diametrically on the opposite side of said screw from said female threaded portion of said segmental nut member.

References Cited

UNITED STATES PATENTS 1,452,384  4/1923  Kissendorfer _____ 269—182
2,461,687  2/1949  Hopfeld _____ 269—182 X LESTER M. SWINGLE, *Primary Examiner.*

J. F. McKEOWN, *Assistant Examiner.*

U.S. Cl. X.R.

269—249